2,881,175

1,1 BIS (p-AMINO PHENYL) ALKANONES

John B. Wright, Kalamazoo Township, Kalamazoo County, Mich., assignor to The Upjohn Company, Kalamazoo, Mich., a corporation of Michigan No Drawing. Application April 25, 1958
Serial No. 730,823

14 Claims. (Cl. 260—294.7)

This invention relates to novel organic compounds, more particularly to 1,1-bis(p-aminophenyl)-2-alkanones and acid addition salts thereof and a process for their production.

The novel compounds of this invention are prepared by reacting a p-tertiaryaminophenyl lithium with an alkyl α-hydrocarbon alkanoate to produce a 1,1-bis(p-aminophenyl)-2-hydrocarbonoxyalkanol which is then reacted with acid to produce a 1,1-bis(p-aminophenyl)-2-alkanone. These compounds and reactions may be represented by the following formulae:

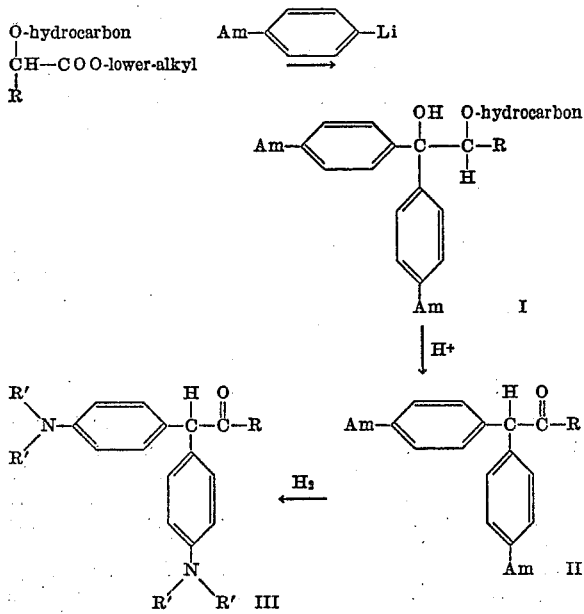

wherein R is an alkyl group containing from one to three carbon atoms, inclusive, Am is tertiary di-lower-alkylamino, tertiary lower-alkylbenzylamino, tertiary dibenzylamino or an alkyleneamino group of the formula

R″ N— wherein R″ is an alkylene radical containing from four to eight carbon atoms, inclusive, which with the amino nitrogen atom form a ring containing from four to five carbon atoms and R′ is a hydrogen or lower-alkyl group. Hydrocarbon is limited to those hydrocarbon radicals containing from one to eight carbon atoms, inclusive, e.g., phenyl, tolyl, xylyl, methyl, ethyl, allyl, octyl, preferably lower-alkyl. The compounds of this invention (II, III) are converted to their acid addition salts by reaction with anhydrous or aqueous acid.

It is an object of this invention to provide 1,1-bis(p-aminophenyl)-2-alkanones (II, III) and acid addition salts thereof. Another object is the provision of processes for the production thereof. Other objects will be apparent to those skilled in the art to which this invention pertains.

The 1,1-bis(p-aminophenyl)-2-alkanones (II, III) and acid addition salts thereof of the present invention are sleep-potentiators when given with hexabarbital, thereby increasing the effectiveness of the hexabarbital or reducing the amount of hexabarbital required to achieve a desired response. They possess progestational activity and produce adrenal hypertrophy, useful in the palliation of adrenal tumor and in treatment of essential hypertension. They possess barbituate-like sedative activity. The novel compounds of this invention are also useful as intermediates in the preparation of the physiologically active 1,1-bis(p-aminophenyl)-2-alkanols, as disclosed more fully in our co-pending application, Serial Number 730,812, filed April 25, 1958, by reduction with lithium aluminum hydride or reaction with an alkyl Grignard reagent. These latter compounds also possess sleep potentiation activity and are effective in the treatment of essential hypertension.

The novel compounds of this invention (II, III) comprise those wherein the amine is substituted with alkyl, alkylbenzyl, dibenzyl, dialkyl or is unsubstituted. The unsubstituted (III, R=H) are prepared by hydrogenating the corresponding dibenzyl amines (II, Am=dibenzylamino). The monoalkyl compounds of this invention are similarly prepared from the alkylbenzylamines (II, Am= alkylbenzylamino) by hydrogenation to produce the monoalkylamine (III, R=H, alkyl). Preferred are the di-lower-alkylamines, preferably dimethylamines. Also preferred are those compounds where R is methyl or ethyl.

The 1,1-bis(p-aminophenyl)-2-alkanones (II) are prepared by treatment of a 1,1-bis(p-aminophenyl)-2-hydrocarbonoxyalkanol (I) with strong acid, e.g., ten percent to concentrated hydrochloric, preferably by heating up to 100 degrees centigrade. Several hours of heating are usually employed to ensure complete reaction. The 1,1-bis-(p-aminophenyl)-2-hydrocarbonoxyalkanols (I) are prepared by the reaction of a p-tertiaryaminophenyl lithium with a lower-alkyl α-hydrocarbonoxyalkanoate as defined above. The p-tertiaryaminophenyl lithium compounds are prepared by the reaction of the corresponding p-bromotertiaryaniline with lithium according to methods known in the art.

The acid addition salts of the compounds of this invention include the hydrochloride, hydrobromide, hydriodide, sulfate, phosphate, nitrate, acetate, formate, citrate, tartrate and lactate. Ordinarily, the di-acid addition salt is prepared by forming a salt of each with the amines. They are conveniently prepared by adding the acid in equivalent or excess amount to a solution of the base under anhydrous conditions. Alternatively, an aqueous solution of the salt can be prepared and the water removed in vacuo.

Compounds of the present invention thus prepared include 1,1-bis(p-aminophenyl)-2-propanone, 1,1-bis(p-aminophenyl)-2-butanone, 1,1-bis(p-aminophenyl)-3-methyl-2-butanone, 2,1-bis(methylaminophenyl)-2-propanone, 1,1-bis(p-methylaminophenyl)-2-butanone, 1,1-bis(p-methylaminophenyl)-3-methyl-2-butanone, 1,1-bis(p-octylaminophenyl)-2-propanone, 1,1-bis(p-ethylaminophenyl)-2-butanone, 1,1-bis-(p-ethylaminophenyl)-3-methyl-2-butanone, 1,1-bis(p-dimethylaminophenyl)-2-propanone, 1,1-bis(p-dimethylaminophenyl)-2-butanone, 1,1-bis(p-dimethylaminophenyl)-3-methyl-2-butanone, 1,1-bis(p-dioctylaminophenyl)-2-propanone, 1,1-bis(p-diethylaminophenyl)-2-butanone, 1,1-bis(p-diethylaminophenyl)-3-methyl-2-butanone, 1,1-bis(p-octylbenzylaminophenyl)-2-propanone, 1,1-bis(p-methylbenzylaminophenyl)-2-butanone, 1,1-bis(p-methylbenzylaminophenyl)-3-methyl-2-butanone, 1,1 - bis(p - dibenzylaminophenyl)-2-propanone, 1,1-bis(p-dibenzylaminophenyl)-2-butanone, 1,1-bis(p-dibenzylaminophenyl) - 3 - methyl-2-butanone, 1,1-bis(p-pyrrolidinophenyl)-2-propanone, 1,1-bis(p-piperidinophenyl)-2-propanone, and the dihydrochloride of each of the above compounds.

The following preparations and examples are illustrative of the process and products of the present invention, but are not to be construed as limiting.

PREPARATION 1

*1,1-bis(p-dimethylaminophenyl)-2-ethoxypropanol*

Into a flask fitted with a mechanical stirrer, dropping funnel, nitrogen inlet tube and an efficient condenser fitted with a calcium chloride drying tube was added 250 milliliters of dry ether and 5.55 grams (0.8 mole) of lithium ribbon. Over the course of about one hour there was then added eighty grams (0.4 mole) of freshly distilled colorless p-bromodimethylaniline dissolved in 200 milliliters of dry ether. Occasional heat was applied to maintain reflux. After addition was complete, reflux was continued for a total of about four hours until practically all of the lithium had reacted.

To the stirred solution of dimethylaminophenyl lithium was added a solution of 29.2 grams of ethyl α-ethoxypropionate in 100 milliliters of dry ether over a period of about fifteen minutes so as to maintain a vigorous reflux. Upon addition of the ester a white solid precipitated immediately. The mixture was maintained overnight and then heated under reflux for two hours. To the stirred solution was then cautiously added 200 milliliters of a twenty percent ammonium chloride solution. The ether layer was separated and the aqueous layer extracted once with 100 milliliters of ether. The combined ethereal solutions upon standing a short time precipitated a solid which was removed by filtration and the filtrate evaporated to dryness in vacuo at room temperature. There was thus obtained 57.1 g. (88 percent) of 1,1-bis(p-dimethylaminophenyl)-2-ethoxypropanol melting at 109 to 115 degrees centigrade. Two crystallizations from Skellysolve C raised the melting point to 120.5 to 121 degrees.

*Analysis.*—Calcd. for $C_{21}H_{30}N_2O_2$: C, 73.64; H, 8.83; N, 8.18. Found: C, 74.09; H, 8.76; N, 8.09.

PREPARATION 2

*1,1-bis(p-dimethylaminophenyl)-2-ethoxybutanol*

The procedure of Preparation 1 was followed on a one half scale using ethyl α-ethoxybutyrate. The recrystallization from Skellysolve C gave 21.5 grams (70 percent) of tan crystals of 1,1-bis(p-dimethylaminophenyl)-2-ethoxybutanol melting at 104 to 109 degrees centigrade. Recrystallization from Skellysolve C raised the melting point to 110.5 to 112 degrees.

Calcd. for: $C_{22}H_{32}N_2O_2$: C, 74.12; H, 9.05; N, 7.86. Found: C, 74.00; H, 8.96; N, 7.82.

PREPARATION 3

*1,1-bis(p-dibenzylaminophenyl)-2-ethoxypropanol*

A twelve-liter flask fitted with stirrer, reflux condenser fitted with a drying tube and a dropping funnel was flushed with nitrogen. To the flask was added 240 grams (0.68 mole) of N-(p-bromophenyl)-dibenzylamine, 5,760 milliliters of anhydrous ether and 9.44 grams (1.36 moles) of lithium ribbon (or lithium emulsion). The mixture was stirred and heated at reflux for six hours.

To the reaction mixture containing p-dibenzylaminophenyl lithium was slowly added with stirring 49.7 grams (0.34 mole) of ethyl α-ethoxypropionate in 150 milliliters of anhydrous ether and refluxing was continued for two hours. The addition product was decomposed with twenty percent aqueous ammonium chloride and the layers separated. The ether layer was washed with water, dried over anhydrous magnesium sulfate and evaporated to dryness, in vacuo, leaving an oily residue of 1,1-(bis (p-dibenzylaminophenyl)-2-ethoxypropanol.

PREPARATION 4

*1,1-bis(p-dimethylaminophenyl)-2-phenoxypropanol*

To a mixture of 5.55 grams (0.8 mole) of lithium ribbon in 250 milliliters of anhydrous ether was added eighty grams (0.4 mole) of p-bromodimethylaniline, dissolved in 200 milliliters of anhydrous ether, over a period of forty minutes. The mixture was refluxed for one hour and to the resulting solution of p-dimethylaminophenyl lithium was then added 38.84 grams (0.2 mole) of ethyl α-phenoxypropionate. The mixture was refluxed for two hours and then decomposed with 200 milliliters of twenty percent aqueous ammonium chloride. The solid which precipitated was separated and washed with ether to give 80.1 grams of 1,1-bis(p-dimethylaminophenyl)-2-phenoxypropanol melting at 164 degrees centigrade (dec.). Two recrystallizations from benzene raised the melting point to 191 to 193 degrees centigrade.

*Analysis.*—Calcd. for $C_{25}H_{30}N_2O_2$: C, 76.89; H, 7.74; N, 7.17. Found: C, 77.30; H, 7.61; N, 7.08.

PREPARATION 5

*1,1-bis(p-methylbenzylaminophenyl)-2-ethoxypropanol*

To a stirred mixture of 425 milliliters of sodium dried ether and 9.44 grams (1.36 mole) of lithium ribbon was added 187.7 grams (0.68 mole) of p-bromo-N-methyl-N-benzylaniline in 340 milliliters of ether over a period of 45 minutes. The mixture was refluxed for 1½ hours and then 49.7 grams (0.34 mole) of ethyl α-ethoxypropionate in 170 milliliters of dry ether was added over a period of thirty minutes. A solid precipitated as the ester was added. The mixture was refluxed for two hours. To the stirred, cooled mixture was cautiously added 400 milliliters of a twenty percent aqueous ammonium chloride solution. The ether layer was separated and the aqueous layer extracted with ether. The combined ether layers were dried over magnesium sulfate and distilled to dryness in vacuo. There remained an oily residue of 183.2 grams of 1,1-bis(p-methylbenzylaminophenyl)-2-ethoxypropanol.

PREPARATION 6

*1,1-bis(p-piperidinophenyl)-2-ethoxypropanol*

To 2.78 grams (0.4 mole) of small pieces of lithium ribbon in 100 milliliters of anhydrous ether was added a slurry of 48.09 grams (0.25 mole) N-(p-bromophenyl) piperidine in 250 milliliters of anhydrous ether. The mixture was stirred and refluxed for two hours and to the resulting solution of p-piperidinophenyl lithium was added a solution of 14.6 grams (0.1 mole) of ethyl α-ethoxypropionate in fifty milliliters of anhydrous ether. The mixture was stirred and refluxed for four hours. To the cooled solution was added 100 milliliters of a twenty percent ammonium chloride solution, causing a precipitate. After standing overnight, the mixture was filtered and the filtrate extracted with ether. There was obtained 27.4 grams of 1,1-bis(p-piperidinophenyl)-2-ethoxypropanol from the cake melting at 144 to 145 degrees centigrade, and 3.6 grams from the ether. Recrystallization of the cake from ethanol gave a product melting at 150 to 153 degrees.

Calcd. for $C_{27}H_{38}N_2O_2$: C, 76.73; H, 9.06; N, 6.63. Found: C, 76.83; H, 9.02; N, 6.78.

EXAMPLE 1

*1,1-bis(p-dimethylaminophenyl)-2-propanone and dihydrochloride*

A solution of 13.68 grams (0.04 mole) of 1,1-bis(p-dimethylaminophenyl)-2-ethoxypropanol in a mixture of 30.6 milliliters of concentrated hydrochloric acid and seventy milliliters of water was refluxed for four hours. This solution was cooled, basified with a saturated sodium carbonate solution and then extracted with three 100-milliliter portions of ether. The extracts were dried and the ether distilled with the last traces removed in vacuo. The light yellow-green residue solidified upon standing and scratching to give 6.14 grams (98 percent) of 1,1-bis(p-dimethylaminophenyl)-2-propanone melting at 61 to 64 degrees centigrade. Recrystallization from ethanol raised the melting point to 65 to 66 degrees.

Calcd. for $C_{19}H_{24}N_2O$: C, 76.99; H, 8.16; N, 9.45. Found: C, 77.20; H, 8.23; N, 9.34.

Similarly, 1,1-bis(p-dimethylaminophenyl) - 2 - propanone is prepared by substituting 1,1-bis(p-dimethylphenyl)-2-phenoxypropanol as the starting compound.

The dihydrochloride was prepared by the addition of an ethereal hydrogen chloride solution to a solution of the free base in ether. Recrystallization from anhydrous ethanol gave 1,1-bis(p-dimethylaminophenyl)-2-propanone dihydrochloride melting at 212 degrees centigrade (dec.).

Calcd. for $C_{19}H_{24}N_2O \cdot 2HCl$: C, 61.78; H, 7.10; N, 7.59; Cl, 19.20. Found: C, 61.71; H, 7.12; N, 7.68; Cl, 19.11.

EXAMPLE 2

1,1-bis(p-dimethylaminophenyl)-2-butanone and dihydrochloride

Following the procedure described in Example 1, 16.5 grams (0.0463 mole) of 1,1-bis(p-dimethylaminophenyl)-2-ethoxybutanol was converted with ten percent hydrochloric acid to 14.0 grams (97.5 percent) of 1,1-bis(p-dimethylaminophenyl)-2-butanone melting at 66.5 to 69.5 degrees centigrade. Repeated recrystallization from ethanol raised the melting point to 71.5 to 72.5 degrees.

Calcd. for $C_{20}H_{26}N_2O$: C, 77.38; H, 8.44; N, 9.03. Found: C, 77.58; H, 8.09; N, 9.29.

In the manner described in Example 1, the free base was converted to the dihydrochloride and after crystallization from ethanol and decolorization with charcoal gave 1,1-bis(p-dimethylaminophenyl)-2-butanone dihydrochloride melting at 204.5 degrees centigrade (dec.).

Calcd. for $C_{20}H_{26}N_2O \cdot 2HCl$: C, 62.66; H, 7.36; N, 7.31. Found: C, 62.82; H, 7.25; N, 7.53.

EXAMPLE 3

1,1-bis(p-dibenzylaminophenyl)-2-propanone and dihydrochloride

The residual oil described in Preparation 3 was refluxed overnight in a mixture of 595 milliliters of acetone and 260 milliliters of concentrated hydrochloric acid. The acetone was removed by distillation at reduced pressure leaving an aqueous mixture of 1,1-bis(p-dibenzylaminophenyl)-2-propanone dihydrochloride. The mixture was diluted with water, neutralized with sodium bicarbonate and extracted with two one-liter portions of chloroform which were separated, washed with water, dried and distilled at reduced pressure. The residue was triturated with ether to give 60.7 grams of 1,1-bis(p-dibenzylaminophenyl)-2-propanone melting at 165 to 182 degrees centigrade and 3.8 grams from the mother liquor. Repeated crystallization from benzene raised the melting point to 189 to 192.5 degrees.

Calcd. for $C_{43}H_{40}N_2O$: C, 85.96; H, 6.71; N, 4.66. Found: C, 85.94; H, 6.75; N, 4.72.

EXAMPLE 4

1,1-bis(p-methylbenzylaminophenyl)-2-propane and dihydrochloride

A solution of 183.2 grams of 1,1-bis(p-methylbenzylaminophenyl)-2-ethoxypropanone in 595 milliliters of acetone and 260 milliliters of concentrated hydrochloric acid was refluxed for sixteen hours. The acetone was distilled and the residue diluted with one liter of water to give an aqueous solution of 1,1-bis(p-methylbenzylaminophenyl)-2-propanone dihydrochloride. The solution was basified with sodium bicarbonate and the oily green precipitate extracted with benzene which was washed with water and then distilled to dryness in vacuo. A small sample of the residual oil was crystallized from boiling Skellysolve C and used to seed the remaining oil. There was obtained 195.2 grams of 1,1-bis(p-methylbenzylaminophenyl)-2-propanone which, when crystallized from cyclohexane, melted at 94 to 96 degrees centigrade. Additional recrystallization raised the melting point to 105 to 107 degrees.

Calcd. for $C_{31}H_{32}N_2O$: C, 83.00; H, 7.19; N, 6.25. Found: C, 83.15; H, 7.40; N, 6.46.

EXAMPLE 5

1,1-bis(p-piperidinophenyl)-2-propanone and dihydrochloride

To 8.44 grams (0.02 mole) of 1,1-bis(p-piperidinophenyl)-2-ethoxypropanol was added 35 milliliters of water and 15.3 milliliters of concentrated hydrochloric acid. The solution was refluxed for four hours and then maintained at room temperature overnight. The solution was filtered through glass wool, basified with sodium bicarbonate and extracted with ether. The extract was dried and the ether distilled to give a blue oily residue of 5.9 grams of 1,1-bis(p-piperidinophenyl)-2-propanone which was redissolved in anhydrous ether and then saturated with ethereal hydrogen chloride. The precipitate was filtered, dissolved in anhydrous ethanol which was mixed with benzene. The solvents were removed in vacuo and the residue triturated with ether until it solidified. There was obtained 6.1 grams of 1,1-bis(p-piperidinophenyl)-2-propanone dihydrochloride as a yellow tan solid that decomposed at about seventy degrees centigrade.

EXAMPLE 6

1,1-bis(p-aminophenyl)-2-propanone and dihydrochloride

Five grams (8.33 millimoles) of finely ground 1,1-bis(p-dibenzylaminophenyl)-2-propanone was suspended in 300 milliliters of alcohol and hydrogenated over 2.0 grams of a ten percent palladium on charcoal catalyst with an initial pressure of fifty p.s.i. The catalyst was removed by filtration and the solution concentrated at reduced pressure to give 2.1 grams of 1,1-bis(p-aminophenyl)-2-propanone melting at 130.5 to 134.5 degrees centigrade. One crystallization from alcohol raised the melting point to 136 to 138.5 degrees and two more crystallizations from isopropyl alcohol gave pale yellow platelets melting at 143.5 to 144 degrees centigrade.

Calcd. for $C_{15}H_{16}N_2O$: C, 74.94; H, 6.71; N, 11.66. Found: C, 74.77; H, 7.06; N, 11.70.

2.75 grams (11.45 millimoles) of 1,1-bis(p-aminophenyl)-2-propanone was dissolved in 24 milliliters of 1 N hydrochloric acid and filtered. The solution was concentrated in a nitrogen stream to a viscous oil which crystallized after the addition of a small amount of isopropyl alcohol, scratching and then 25 milliliters of ethyl acetate. The mixture was chilled and filtered to give 3.54 grams of the half hydrate of 1,1-bis(p-aminophenyl)-2-propanone which had no definite melting point even after two crystallizations from an isopropyl alcohol-water mixture.

Calcd. for $C_{15}H_{16}N_2O \cdot 2HCl \cdot 1/2H_2O$: C, 55.91; H, 5.94; Cl, 22.01; N, 8.70. Found: C, 56.27; H, 6.07; Cl, 22.10; N, 8.60.

EXAMPLE 7

1,1-bis(p-methylaminophenyl)-2-propanone and dihydrochloride

Ten grams (0.022 mole) of 1,1-bis(p-methylbenzylaminophenyl)-2-propanone was hydrogenated over 4.0 grams of ten percent palladium on charcoal catalyst in 300 milliliters of 95 percent ethanol with an initial pressure of fifty p.s.i. After three hours, the catalyst was removed and washed with 95 percent ethanol. The filtrate and washings were combined and concentrated to dryness in vacuo. The residual yellow oil of 1,1-bis(p-methylaminophenyl)-2-propanone was then dissolved in anhydrous ether, filtered and the dihydrochloride was precipitated by adding ethereal hydrogen chloride. There was obtained 6.3 grams of 1,1-bis(p-methylaminophenyl)-2-propanone dihydrochloride as a white hygroscopic solid.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:
1. A compound selected from the group consisting of 1,1-bis(p-aminophenyl)-2-alkanones represented by the formula

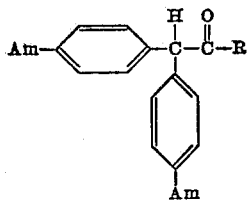

wherein R is an alkyl group containing from one to three carbon atoms, inclusive, and Am is an amino group selected from the group consisting of primary amino, lower-alkylamino, di-lower-alkylamino, lower-alkylbenzylamino, di-benzylamino and alkyleneamino of the formula

wherein R' is an alkylene group containing from four to eight carbon atoms, inclusive, which with the amino nitrogen atom forms a ring containing from four to five carbon atoms.

2. Acid addition salts of 1,1-bis(p-aminophenyl)-2-alkanones represented by the formula

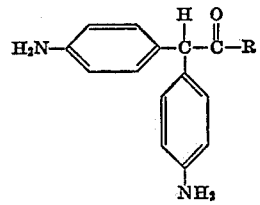

wherein R is an alkyl group containing from one to three carbon atoms, inclusive.

3. 1,1-bis(p-aminophenyl)-2-propanone dihydrochloride.

4. Acid addition salts of 1,1-bis(p-aminophenyl)-2-alkanones represented by the formula

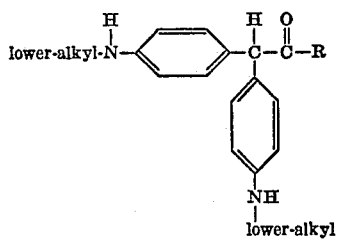

wherein R is an alkyl group containing from one to three carbon atoms, inclusive.

5. 1,1-bis(p-methylaminophenyl)-2-propanone dihydrochloride.

6. Acid addition salts of 1,1-bis(p-aminophenyl)-2-alkanones represented by the formula

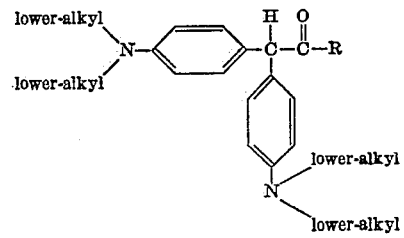

wherein R is an alkyl group containing from one to three carbon atoms, inclusive.

7. 1,1-bis(p-dimethylaminophenyl)-2-propanone dihydrochloride.

8. 1,1-bis(p-dimethylaminophenyl)-2-butanone dihydrochloride.

9. Acid addition salts of 1,1-bis(p-aminophenyl)-2-alkanones represented by the formula

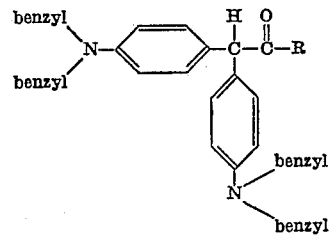

wherein R is an alkyl group containing from one to three carbon atoms, inclusive.

10. 1,1-bis(p-dibenzylaminophenyl)-2-propanone dihydrochloride.

11. Acid addition salts of 1,1-bis(p-aminophenyl)-2-alkanones represented by the formula

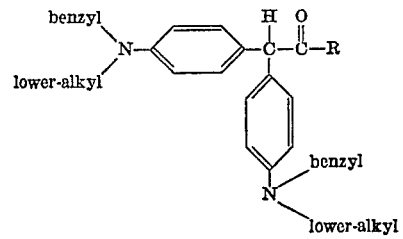

wherein R is an alkyl group containing from one to three carbon atoms, inclusive.

12. 1,1-bis(p-methylbenzylaminophenyl)-2-propanone dihydrochloride.

13. Acid addition salts of 1,1-bis(p-aminophenyl)-2-alkanones represented by the formula

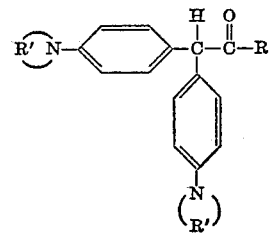

wherein R is an alkyl group containing from one to three carbon atoms, inclusive, and R' is an alkylene group containing from one to eight carbon atoms, inclusive, which with the amino nitrogen forms a ring containing from four to five carbon atoms.

14. 1,1-bis(p-piperidinophenyl)-2-propanone dihydrochloride.

No references cited.